United States Patent
Mushkin et al.

(10) Patent No.: US 6,907,472 B2
(45) Date of Patent: Jun. 14, 2005

(54) DISTRIBUTED SYNCHRONIZATION MECHANISM FOR SHARED COMMUNICATIONS MEDIA BASED NETWORKS

(75) Inventors: Mordechai Mushkin, Nirit (IL); Dan Raphaeli, Kfar Saba (IL); Jacob Vainappel, Herzelia (IL)

(73) Assignee: Yitran Communications Ltd., Beer Sheva (IL)

( * ) Notice: Subject to any disclaimer, the term of this patent is extended or adjusted under 35 U.S.C. 154(b) by 807 days.

(21) Appl. No.: 09/822,939

(22) Filed: Mar. 30, 2001

(65) Prior Publication Data

US 2002/0178292 A1 Nov. 28, 2002

(51) Int. Cl.⁷ .......................... G06F 15/16; G06F 11/00
(52) U.S. Cl. ...................................... 709/248; 713/503
(58) Field of Search ........................ 709/248; 513/400, 513/401, 500, 501, 503

(56) References Cited

U.S. PATENT DOCUMENTS

| | | | |
|---|---|---|---|
| 4,332,027 A | 5/1982 | Malcolm et al. | 370/94 |
| 4,413,258 A | 11/1983 | Quick, Jr. et al. | 340/825.5 |
| 5,550,873 A | 8/1996 | Dolev et al. | 375/354 |
| 5,579,513 A * | 11/1996 | Strohmer | 713/600 |
| 5,784,421 A | 7/1998 | Dolev et al. | 375/354 |
| 5,802,295 A | 9/1998 | Fukui et al. | |
| 5,907,685 A | 5/1999 | Doucher | |
| 6,128,318 A | 10/2000 | Sato | |
| 6,324,586 B1 | 11/2001 | Johnson | |
| 6,351,821 B1 | 2/2002 | Voth | |
| 6,418,150 B1 | 7/2002 | Staats | |
| 6,711,411 B1 * | 3/2004 | Ruffini | 455/502 |
| 6,714,563 B1 * | 3/2004 | Kushi | 370/503 |

* cited by examiner

Primary Examiner—Krisna Lim
(74) Attorney, Agent, or Firm—Zaretsky & Associates PC; Howard Zaretsky

(57) ABSTRACT

A novel and useful distributed synchronization mechanism. The synchronization loop of each station on the shared media based network considers only synchronization signals received having a time phase earlier than the time phase of its internal clock. From among the plurality of synchronization signals received by a given station having a time phase earlier than that of its internal clock, only the earliest of the received synchronization signals is considered. This allows the use of a second order synchronization tracking loop wherein both the phase and rate of the internal clock are tracked and adjusted. The station with the fastest internal clock effectively functions as an ad-hoc synchronization master for all stations in a given maximum connected group.

45 Claims, 8 Drawing Sheets

DISTRIBUTED SYNCHRONIZATION MECHANISM FOR SHARED COMMUNICATIONS MEDIA BASED NETWORKS

FIELD OF THE INVENTION

The present invention relates generally to data communication systems and more particularly relates to a distributed synchronization mechanism suitable for use in networks based on shared communication media such as power line carrier.

BACKGROUND OF THE INVENTION

In recent years, the world has witnessed explosive growth in the demand for all types of communications and it is predicted that this demand will increase in the future. It is expected that power line carrier (PLC) will play a major role in providing communications in the home, SOHO and corporate enterprise environments. One of the main attractions of using PLC communications is that communications take place over existing electrical power utility wiring. Networks running over traditional LAN cabling require that copper or optical fiber cable be installed, usually at great labor and material expense. PLC networks, however, do not require any special installation of cable since they utilize the power line wiring that already exists in the building structure.

In addition, it is a growing trend within the electrical device industry to enable previously stand alone electrical devices, such as sensors and lighting control devices, to communicate with each other over some type of communications network. Previously, sensor, switch and control devices communicated using point-to-point connections. Nowadays, manufacturers are building communication means into these devices to enable them to communicate over some type of shared medium constructed as one or more local area networks (LANs). A variety of systems is currently commercially available which electrical device manufacturers can integrate into their products to enable them to communicate over a network. A convenient medium for these devices to communicate over is the power line since most devices are already coupled to the wiring system for drawing electrical power.

One such communication system is the CEBus system that has been made an EIA standard, known as the EIA 600 standard, which was originally developed by Intellon Corp. A second well-known communications system is the LonWorks system, known as the EIA 709 standard, commercially available from and developed by Echelon Corp. Both the CEBus and LonWorks systems specify physical and link layer means for communicating over a variety of different media including power line carrier, coaxial cable, fiber optic cable, radio frequency (RF), infrared (IR) and twisted pair cable.

The commonly used ISO OSI communications model specifies a seven layer communications protocol stack comprising a physical layer, link or media access control (MAC) layer, network later, transport payer, session layer, presentation layer and an application layer. The main functionally of the MAC layer and associated protocol, is to provide an effective method of accessing the physical channel, which in this case is the power line. Along with basic channel access, the MAC protocol ideally also provides (1) efficient and reliable host packet and session transport for the different kinds of possible connections, including unicast, multicast and broadcast, (2) efficient addressing scheme for the stations connected to the network, (3) repeater functionality for large networks with stations spread over large distances and (4) quality of service functionality.

The main function of any MAC protocol is to provide an effective channel access method that enables efficient and reliable host packet transport for the different kinds of possible connections, e.g., unicast, multicast and broadcast connections.

A channel access scheme that is in widespread use today is known as Carrier Sense Multiple Access (CSMA) that is used for example in Ethernet LANs (IEEE Standard 802.3) and wireless LANs (IEEE Standard 802.11). They are commonly used in networks that comprise shared media whereby multiple nodes simultaneously have access to the same media. The media may be any physical medium that can be simultaneously shared by many nodes, such as a cable, RF, powerline, etc.

Powerline Network Characteristics

An example of a network based on a shared communication media is shown in FIG. 1. The network, generally referenced 10, comprises a plurality of communication stations (or nodes) 12 that are connected to a shared communications physical media 14. An example of a shared media is the AC powerline wiring grid found in homes, offices and enterprises. In a residential environment, groups of neighboring residences are coupled together via the outdoor wiring, thus forming a huge common media. The signal propagates over a wide area due to mutual inductive coupling which in some cases permits a signal transmitted on one phase to be induced in other phases. Note that the powerline media remains shared until reaching a transformer where signals may not be able to propagate beyond without the use of signal couplers due to poor inductive coupling.

The following definitions relating to connectivity between stations are applicable throughout this document.

Directly connected: Two stations are considered to be directly connected to each other if each station can detect the signals transmitted by the other station.

Indirectly connected: Two stations A and B are considered to be indirectly connected to each other if they are not directly connected but there is a path comprising N stations that are directly connected to each other from station A to station B. In other words, there is a set of N stations denoted $S_1, S_2, \ldots S_N$ such that station A can hear station $S_1$, station B can hear station $S_N$ and station $S_n$ is directly connected to station $S_{n+1}$ for every n=1, 2, N−1.

Connected—Two stations are considered connected to each other if they are either directly connected or indirectly connected to each other.

Connected group—A group of stations is considered to be a connected group if each pair of stations within the group is connected to each other.

Maximum connected group—A group of stations is considered to be a maximum connected group if the group is a connected group and it is not a proper subset of any larger connected group.

With reference to the above definitions, in a network based on a shared communications media, it is desirable that stations directly connected to each other be synchronized. Note that achieving this implies that all stations within a given maximum connected group are synchronized to one another.

A shared media such as the powerline is typically characterized by a large variety of different signal propagation conditions. Stations on the same logical network may not be able to detect each other's transmissions, thus creating a hidden node problem whereby portions of the media are invisible from other parts.

Another characteristic of power line based networks is that stations on different logical networks may share the same physical network. In many cases, a home, enterprise or other premise includes more than one communication network. Each communication network may be made up of a plurality of stations. All stations of the same network implement the same communication technique and are able to communicate with each other thus permitting interoperability (assuming that the propagation conditions over the media enable communication). Stations from different networks may implement different communications techniques, in which case they are not able to communicate with each other. In addition, the propagation characteristics of the shared media (e.g., the powerline grid) may have large variations and irregularities. This results in large variations in the attenuation over the communication path between two given nodes.

Since the powerline grids of neighboring residences are physically connected via the power distribution network, the common media of FIG. 1 might refer to the powerline grid of a single residence or to the powerline grids of several neighboring residences (e.g. several apartments in a building).

A characteristic of power line networks is that they might be ad hoc in nature meaning that stations may be added to or removed from the network at any time. In such types of networks, there is no system administrator or installer as there are in other well controlled networks such as telecommunication carrier WANs, corporate networks, etc. No calibration measurements are taken and each end user buys and installs devices independent of and without knowledge of other users of the network.

To permit efficient communications on a shared communications media, a mechanism is needed to synchronize the transmissions of the various stations connected to the network.

SUMMARY OF THE INVENTION

Accordingly, the present invention provides a novel and useful distributed synchronization mechanism. The mechanism of the present invention is useful in communication systems characterized by shared media such as networks that use power carrier communications. In general, the invention is applicable where a plurality of stations is connected to a shared communication media and it is desired to maintain synchronization between the stations. The invention is particularly applicable to situations wherein the stations are organized in an ad-hoc manner and/or wherein full visibility between all stations is not always guaranteed.

An improved mechanism of distributed synchronization is provided whereby the synchronization loop of each station on the network considers only synchronization signals received having a time phase earlier than the time phase of its internal clock. From among the plurality of synchronization signals received by a given station having a time phase earlier than that of its internal clock, only the earliest of the received synchronization signals is considered. This allows the use of a second order synchronization tracking loop wherein both the phase and rate of the internal clock are tracked and adjusted.

As a consequence of considering only the earliest of the received synchronization signals, the station with the fastest internal clock effectively functions as an ad-hoc synchronization master for all stations in a given maximum connected group. Also, the rates of the internal clocks of all stations within a given maximum connected group eventually are adjusted to the frequency of the ad hoc master within the maximum connected group. In addition, since all stations ultimately adjust their internal clock to the same rate, the transmission phase of each station, relative to each other, is highly stable.

It is noted that the main application of the invention is in communications networks, hence the terms stations refers to communication nodes. It is appreciated, however, that stations other than communication nodes may also need to be synchronized. In the communications example presented herein, the shared media is used for both data transmission and for synchronization signal transmission. In non-communication applications (e.g., synchronization of mechanical tools), however, the shared media is used only for the transmission of synchronization signals and not for data.

Many aspects of the previously described invention may be constructed as software objects that execute in embedded devices as firmware, software objects that execute as part of a software application on a computer system running an operating system such as Windows, UNIX, LINUX, etc., an Application Specific Integrated Circuit (ASIC) or functionally equivalent discrete hardware components.

There is thus provided in accordance with the present invention a method of distributed synchronization for use in a network comprising a plurality of stations communicating over a shared media, the method comprising the steps of detecting, on a given station, one or more synchronization signals transmitted by stations directly connected to the given station and aligning the phase and rate of an internal clock in the given station in accordance with an earliest received synchronization signal having a time phase earlier to the time phase of the internal clock.

There is also provided in accordance with the present invention a method of synchronizing a plurality of stations directly connected to each other in a shared communications media based network, the method comprising the steps of attempting, on a given station, to detect other stations already active in the network, and if one or more synchronization signals are detected, updating the phase of an internal clock in the given station in response to an earliest received synchronization signal received before the expected next tick of the internal clock, updating the rate of the internal clock as a function of the time difference between time phase of the earliest received synchronization signal and the time phase of the given station and the given station transmitting synchronization signals upon achieving phase and rate alignment with the earliest received synchronization signal.

There is further provided in accordance with the present invention an apparatus for synchronizing a plurality of stations directly connected to each other over a shared communications media based network comprising a detection mechanism adapted to detect synchronization signals transmitted by other stations already active in the network, a phase acquisition mechanism adapted to update the phase of an internal clock in a given station in response to an earliest detected synchronization signal received before the expected next tick of the internal clock, a rate acquisition mechanism adapted to update the rate of the internal clock as a function of the time difference between time phase of the earliest detected synchronization signal and the time phase of the given station and a transmission mechanism adapted to transmit synchronization signals upon achieving phase and rate alignment with the earliest detected synchronization signal.

There is also provided in accordance with the present invention a communications station for transmitting and receiving signals to and from other directly connected stations over a shared communications media based network comprising a coupling circuit for generating a receive signal received over the network and for outputting a transmit signal onto the network, a transmitter adapted to modulate data to be transmitted in accordance with a modulation scheme so as to generate the transmit signal therefrom, a receiver adapted to demodulate the receive signal in accordance with the modulation scheme so as to generate synchronization signals and a receive data signal therefrom, a media access control (MAC) circuit adapted to interface an application processor to the shared communications media, a synchronization control circuit comprising means adapted to: detect one or more synchronization signals transmitted by the other directly connected stations, align the phase and rate of an internal clock in accordance with an earliest received synchronization signal having a time phase earlier to the time phase of the internal clock, and the processor adapted to control the operation of the transmitter, receiver and MAC and to provide an interface between the MAC and an external host.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
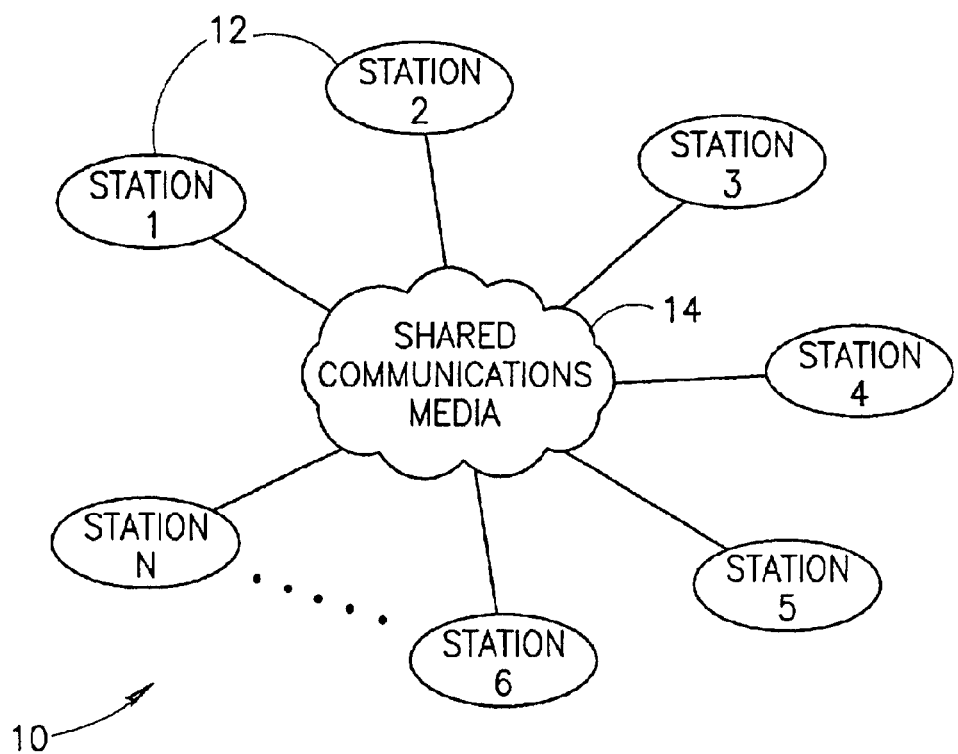
FIG. 1 is a diagram illustrating an example shared communication media based network.

The following notation is used throughout this document.

| Term | Definition |
| --- | --- |
| AC | Alternating Current |
| ASIC | Application Specific Integrated Circuit |
| CD | Carrier Detect |
| CSMA | Carrier Sense Multiple Access |
| EEROM | Electrically Erasable Read Only Memory |
| EIA | Electrical Industry Association |
| FPGA | Field Programmable Gate Array |
| IEEE | Institute of Electrical and Electronic Engineers |
| IR | Infrared |
| ISO | International Standards Organization |
| LAN | Local Area Network |
| MAC | Media Access Control |
| OSI | Open Systems Interconnect |
| PBX | Private Branch Exchange |
| PLC | Power Line Carrier |
| RAM | Random Access Memory |
| RF | Radio Frequency |
| ROM | Read Only Memory |
| SOHO | Small Office/Home Office |
| WAN | Wide Area Network |

DETAILED DESCRIPTION OF THE INVENTION

The present invention is a novel and useful distributed synchronization mechanism. The mechanism of the present invention is useful in communication systems characterized by shared media such as networks that use power carrier communications. In general, the invention is applicable where a plurality of stations is connected to a shared communication media and it is desired to maintain synchronization between the stations. The invention is particularly applicable to situations wherein the stations are organized in an ad-hoc manner and/or wherein full visibility between all stations is not always guaranteed.

An improved mechanism of distributed synchronization is provided whereby the synchronization loop of each station on the network considers only synchronization signals received having a time phase earlier than the time phase of its internal clock. From among the plurality of synchronization signals received by a given station having a time phase earlier than that of its internal clock, only the earliest of the received synchronization signals is considered. This allows the use of a second order synchronization tracking loop wherein both the phase and rate of the internal clock are tracked and adjusted.

For purposes of this specification, the term 'station' or 'communication node' shall be taken to mean any network entity, implemented in either hardware or software, which may be the endpoint of a call, link or connection within a shared media based network. The network may comprise any type of shared network or media including but not limited to power line based networks, twisted pair networks, IR wireless networks, RF wireless networks, optical fiber ring networks, etc. The term 'call,' 'link' or 'connection' shall be taken to mean any communication path that is established between at least two nodes for the purpose of communication therebetween.

Most synchronization schemes are either of the centralized or distributed type. In a centralized synchronization scheme, a single station, referred to as the master, provides the timing for all the slave stations in the network. In a distributed synchronization scheme, no one station acts as a master and all stations can transmit synchronization signals. Both schemes are provided by the present invention and described in detail hereinbelow.

Master/Slave Synchronization

Figure 2:
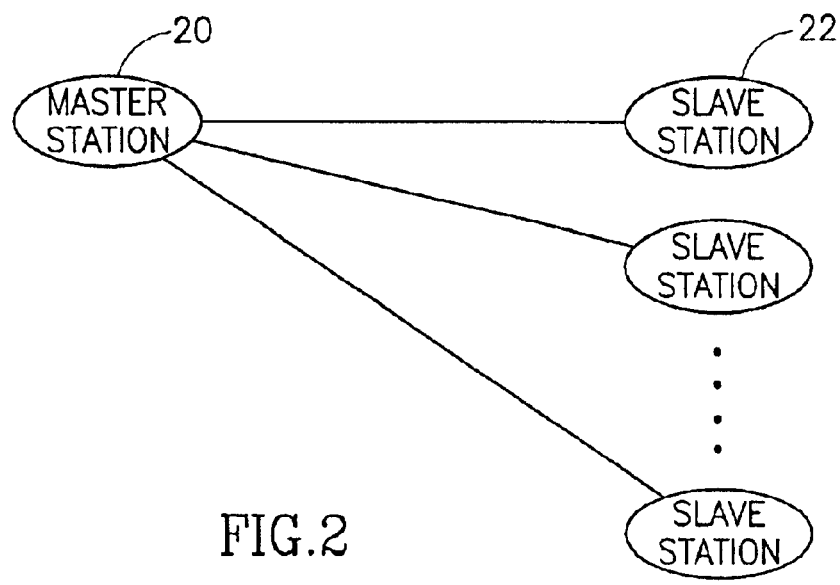
FIG. 2 is a diagram illustrating a master station providing synchronization for a plurality of slave stations.

A diagram illustrating a master station providing synchronization for a plurality of slave stations is shown in FIG. 2. In this type of synchronization scheme, one of the stations in the network is the master station 20 and the other stations are slave stations 22. Slave stations, in turn, may be masters for other slave stations thus creating a synchronization hierarchy. In many networks, synchronization between stations is usually implemented using such a master/slave hierarchy. In this case, every station has a unique master associated with it and is operative to maintain synchronization with this master.

A slave station is synchronized to a master station as described below. Note that although the description is presented in the context of an example, it is appreciated that one skilled in the art can apply the principles of present invention to other configurations as well.

In this scheme, each station in the network maintains its own internal clock. The master station sends synchronization signals in accordance with the ticks of its internal clock. Each slave station detects these signals and aligns its internal clock so that its ticks will occur at approximately the same time as the ticks of the internal clock of the master station. Absolute synchronization is, of course, not practical and the quality of the synchronization is determined by the magnitude of the deviation between the time triggers produced by the two stations.

Note that the initial free running rates of both clocks have the same nominal value, and in the ideal case have the same actual value. Practically, however, the actual free running rates of both clocks have some tolerance around a nominal value. Note that typical tolerances are in the range of ±1 ppm to ±100 ppm depending on quality of the frequency reference source used to generate the clock, e.g., temperature compensated crystal oscillators, ceramic oscillators, etc.

Synchronization is achieved in the network by aligning the internal clock of the slave station. Alignment can be achieved by means of a first-order tracking loop which is adapted to adjust only the phase of the internal clock. Alternatively, it can be achieved using a second order tracking loop which adjusts not only the phase but also the rate of the internal clock.

Note that for purposes of describing the operation of the invention, it is assumed that the internal clocks of the all stations are derived from a reference clock (also internal to the stations) that operates at a much higher rate than the slower internal clock. For example, the nominal rate of the reference clock may be 50 MHz while the nominal rate of the internal clock to be synchronized is 1 kHz. In this case, the ticks of the internal clock occur (i.e. are triggered) every T=5000 ticks of the reference clock.

In a first order tracking loop the phase of the internal clock of the slave station is adjusted to the time phase of the synchronization signals received from the master. The rate of the internal clock, however, is not changed. For example, if tick number n of the internal clock of a slave station occurs at time or tick t(n) of the reference clock and the corresponding synchronization signal is received at time or tick $t_{received}$ of the reference clock, then the scheduled time for the next tick of the internal clock can be expressed as $$t(n+1) = t(n) + T_{nominal} + t_{correction} \quad (1)$$

where $t(n)$ is the time of the reference clock corresponding to tick n of the internal clock;

$t(n+1)$ is the time of the reference clock corresponding to tick n+1 of the internal clock;

$T_{nominal}$ is the ratio between the reference clock and the internal clock (e.g., 5000 in the example presented above);

$t_{correction}$ is a phase correction value calculated by the first order tracking loop;

An expression for calculating the phase correction value $t_{correction}$ is given below as follows $$t_{correction} = \alpha \cdot [t_{received} - t(n)] \quad (2)$$

wherein $\alpha$ is a parameter set within the range $0 < \alpha \leq 1$. The function of the parameter $\alpha$ is to provide a tradeoff between either fast or slow tracking. High values for $\alpha$ provide for quicker tracking since more of the time difference between the two clocks is incorporated into the phase correction. High values of $\alpha$, however, causes noisier tracking. On the other hand, low values of $\alpha$ provide slower but less noisy tracking.

It is important to note that in many cases the reception of a synchronization signal at each clock tick is not guaranteed. Synchronization signals may be detected for example because of difficulties in detection due to excessive noise, interference, etc. At the clock ticks where no signal is detected, the correction value $t_{correction}$ is set to zero. Note also that some signals may be detected with low probability, making any timing derived therefrom less accurate.

Figure 3:
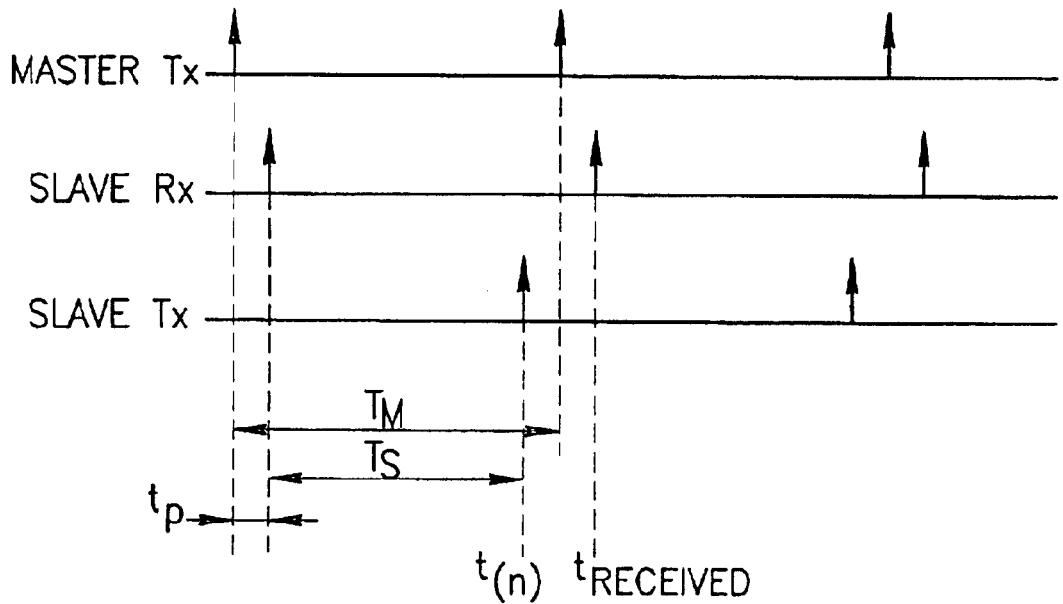
FIG. 3 is a diagram illustrating the synchronization timing of two stations in a master/slave relationship.

A diagram illustrating the synchronization timing of two stations in a master/slave relationship is shown in FIG. 3. The master station periodically transmits synchronization signals (indicated by the vertical arrows) that are received by the slave stations after some propagation delay $t_p$. In response, the slave stations adjust their internal clocks according to the received synchronization signals. The clock period of the master is given by $T_M$ while the clock period of the slave is given by $T_S$. In the very probable event that the two clock periods are not equal, the rate of the internal clock of the slave will not be synchronized with that of the master. The phase of both internal clocks, however, are synchronized since the slave adjusts its expected time for the next tick of its internal clock t(n+1) as a function of the difference between the expected time for the current tick and the time the synchronization signal was received from the master as expressed in Equation 1 above.

Thus, the performance of a first order synchronization tracking loop is inherently limited by the difference between the rates of the internal clocks of the master and slave stations. This difference is not completely compensated for by the first order tracking loop. If a small value of $\alpha$ is chosen, the residual phase difference caused by incomplete compensation of the difference in clock rates can be relatively high. If a large value $\alpha$ is chosen, the residual phase difference caused by the difference in rates is smaller but the resultant jitter is higher due to the noise in the received signals.

A second order tracking loop is used to adjust not only the phase but also the rate of the internal clock. An example is provided in which both the phase and rate of the internal clock of the slave station is adjusted. In this example, the phase is adjusted in the same manner as described above for the first order tracking loop with the difference that the nominal period $T_{nominal}$ is now replaced with a variable period T that is adjustable. The initial value of T is set to the nominal period $T_{nominal}$. The period T is adjusted in accordance with the phase correction values as follows $$T_{new} = T_{old} + \beta \cdot t_{correction} \qquad (3)$$

where $T_{new}$ is the updated value for the period;
$T_{old}$ is the previous value for the period;
$t_{correction}$ is given by Equation 2 above;
$\beta$ is a rate factor within the range $0 < \beta \leq 1$;

The parameter $\beta$ determines the speed of the rate alignment process. Typically, the rates of the internal clocks are relatively stable. Therefore, in most cases there is no need for fast rate alignment and $\beta$ can be set to a relatively small value. Using a small value for $\beta$ increases the stability of the rate tracking process and reduces the station's susceptibility to noisy reception.

Using the second order tracking loop, the differences between the rates of the two internal clocks are eventually eliminated. Each cycle of the tracking loop, the period of the slave clock is adjusted slightly to match that of the master. Thus, the performance of a second order synchronization loop are inherently better than that of a first order synchronization loop.

Distributed Synchronization

First Embodiment

There are many situations, however, where master/slave synchronization techniques such as those described above are not applicable. Such is the case, for example, in many ad hoc networks where the installation and removal of stations are not under any central control but are performed by many independent users. For these cases, the present invention provides a distributed synchronization mechanism.

Figure 4:
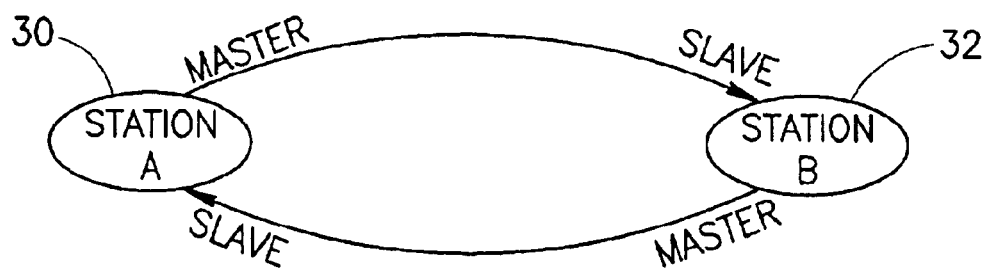
FIG. 4 is a diagram illustrating two stations in a distributed synchronization scenario wherein each functions both as the master and as a slave.

A diagram illustrating two stations in a distributed synchronization scenario wherein each functions both as a master and as a slave is shown in FIG. 4. At any one time, station A 30 or station B 32 may act as the master while the other station acts as the slave. This is indicated by the arrows labeled with mast at the tail and slave at the head. Note that although only two stations are shown in this example, distributed synchronization is applicable to any number of stations whereby all stations can act as a master.

In the distributed synchronization scheme, each given station comprises a detection mechanism adapted to detect the synchronization signals transmitted by all other stations directly connected to the given station and, in response thereto, to align its internal clock in accordance with the detected synchronization signals. Once a given station achieves synchronization, it begins to transmit synchronization signals. These synchronization signals, in turn, are used by other stations to synchronize their internal clocks. In the example presented herein, transmissions and receptions are time multiplexed on a random basis in order to overcome the difficulty inherent with concurrent transmission and reception. It is not intended, however, that the present invention be limited to the time multiplexing of transmissions and receptions.

The main principle of the distributed synchronization algorithm presented above is that a given station synchronizes its internal clock on an aggregated timing signal derived from all the synchronization pulses received from other stations directly connected to the given station.

Figure 5:
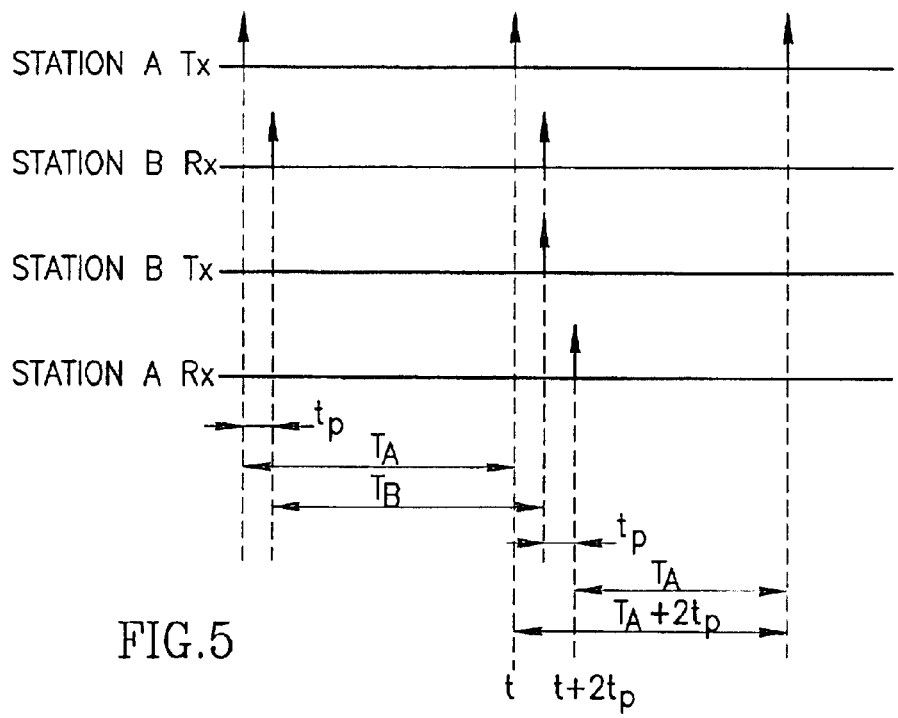
FIG. 5 is a diagram illustrating the synchronization timing of two stations in a distributed synchronization scenario.

A diagram illustrating the synchronization timing of two stations in a distributed synchronization scenario is shown in FIG. 5. With reference to the distributed synchronization example presented above, a simplified scenario comprising two stations only, i.e. stations A and B, is presented. Initially, station A transmits its synchronization signal at a given time phase t. The variable t, in this example, is utilized modulo the nominal clock period. The propagation delay between the two stations is denoted $t_p$ and the synchronization signal is thus received at station B at time phase $t + t_p$.

Since both stations try to synchronize on each other's transmission, station B transmits its synchronization signal at time phase $t + t_p$. This signal is received by station A at time phase $t + 2t_p$. Since station A is attempting to synchronize to station B, however, station A will eventually adjust its synchronization signal to time phase $t + 2t_p$, which in turn causes station B to adjust its signal to time phase $t + 3t_p$, and so on and so forth. Consequently, both stations will perceive a constant drift of the received signals in comparison with their internal clocks. Therefore, in the event both stations implement a second order tracking loop, both stations will end up increasing their clock interval. Unlike in conventional tracking loops, however, increasing the clock period in this case will not decrease the drift but rather causes the clock interval to eventually diverge to infinity.

As shown in the example in FIG. 5, the period of station A is initially $T_A$ wherein in response to the transmission by station B, station A adjusts its period to be $T_A + 2t_p$ in the next internal clock cycle. The period grows and grows until eventually it diverges to infinity.

Thus, it is very difficult at best if not impossible to use a second order tracking loop in a distributed synchronization scenario as described above. Thus, due to this limitation, the distributed synchronization mechanism described above must be used with a first-order tracking loop which would reduce its performance in some cases.

Distributed Synchronization

Second Embodiment

The present invention provides a solution to this problem in a distributed synchronization mechanism that is operative to adjust both the phase and rate of the internal clock of a given station in implementing a second order tracking loop.

In accordance with the present invention, an improved mechanism of distributed synchronization is provided whereby the synchronization loop of a given station considers only synchronization signals received having a time phase earlier than the time phase of its internal clock. From among the plurality of synchronization signals received by a given station having a time phase earlier than that of its internal clock, only the earliest of the received synchronization signals is considered. The synchronization loop implemented by the given station comprises a second order loop, i.e. both phase and rate of the internal clock are tracked and adjusted.

As a consequence of considering only the earliest of the received synchronization signals, the distributed synchronization mechanism of the present invention exhibits the following behavior: (1) within a given maximum connected group of stations, the station with the fastest internal clock effectively functions as an ad-hoc synchronization master for all stations in the given maximum connected group; (2)

the rates of the internal clocks of all stations within a given maximum connected group are eventually adjusted to the rate of the ad hoc master within the maximum connected group; and (3) since all stations ultimately adjust their internal clock to the same rate, the transmission phase of each station, relative to each other, is highly stable.

Figure 6:
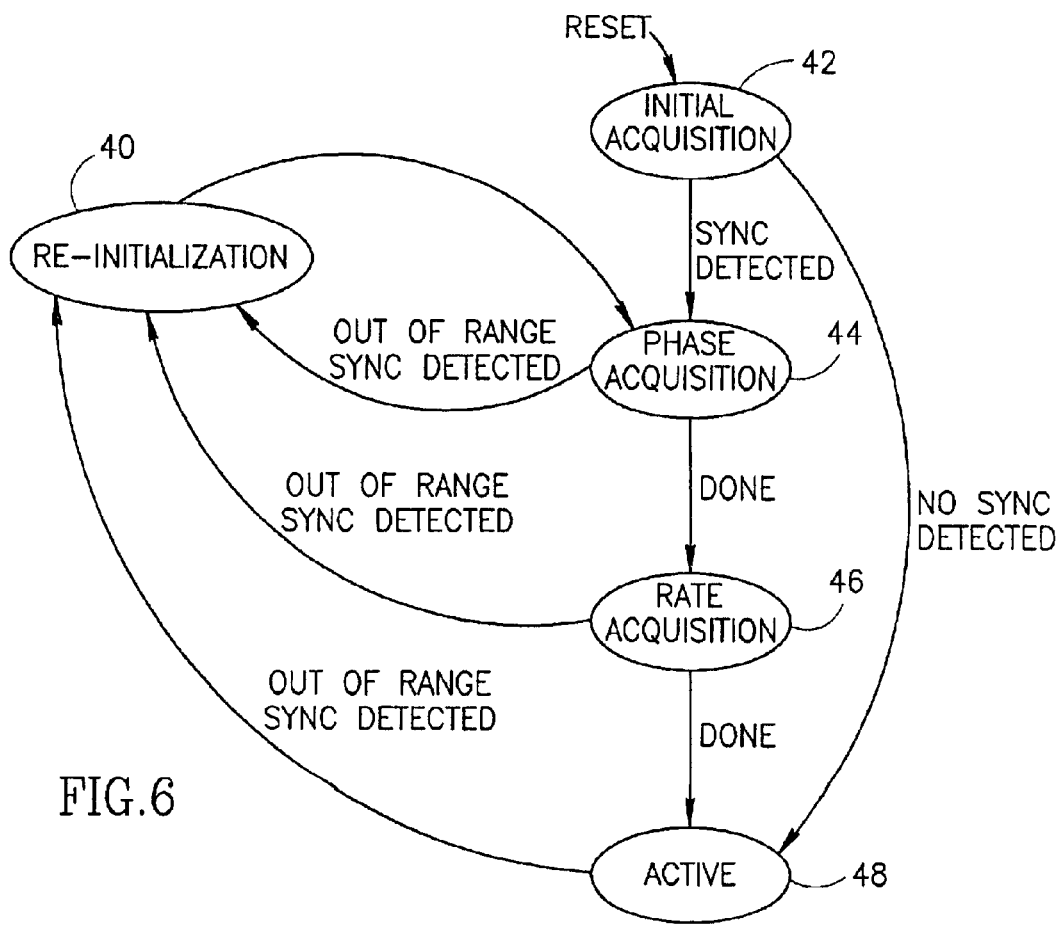
FIG. 6 is a state transition diagram illustrating the operation of the distributed synchronization mechanism of the present invention.

An illustrative embodiment is presented whereby each station in the network is adapted to execute a state machine, or similar functionality implemented in either hardware or software, incorporating the distributed synchronization mechanism of the present invention. A state transition diagram illustrating the operation of the distributed synchronization mechanism of the present invention is shown in FIG. 6. In this example embodiment, a station can be in one of the following states: Initial Acquisition state 42, Phase Acquisition state 44, Rate Acquisition state 46, Active state 48 or Re-initialization state 40.

In accordance with the invention, each station in the network comprises a free running reference clock at some specified nominal rate (e.g., 50 MHz) and an internal clock having a nominal rate (e.g., 1 kHz) much lower than that of the reference clock. The internal clock is derived from the reference clock by means of two variables, t and T as defined and described supra. The variable t represents the time of the next tick of the internal clock in terms of reference clock ticks. The period T represents the period between successive internal clock ticks. Other entities maintained by each station include an initial acquisition period parameter and an acquisition counter.

Figure 7:
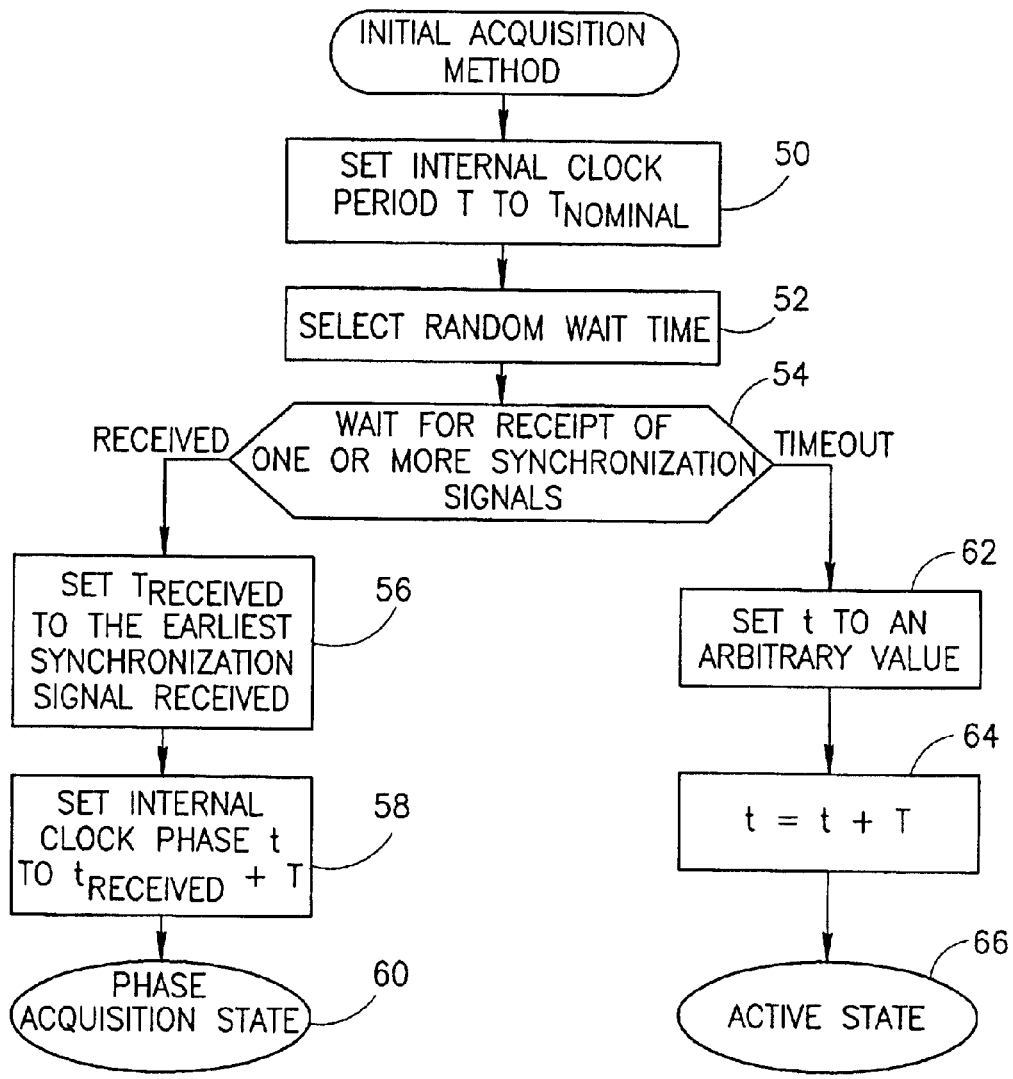
FIG. 7 is a flow diagram illustrating the method of the Initial Acquisition state in more detail.

When a given station is turned on or after the occurrence of a reset, a station enters the Initial Acquisition state 42. A flow diagram illustrating the method of the Initial Acquisition state in more detail is shown in FIG. 7. While in this state, the station attempts to detect the synchronization signals transmitted by other stations that are already in the Active state. First, the station sets its internal clock period T to $T_{nominal}$ (step 50). It then selects a random wait time for the initial acquisition period (step 52). The value chosen represents the time the station will remain in the Initial Acquisition state in case where there is no other active station. The value of the initial acquisition period is selected randomly within a range defined by a minimum and maximum initial acquisition period. The minimum initial acquisition period parameter is chosen to ensure that if another station is already active, its synchronization signals will be detected with high probability during this period. A practical example for the minimum initial acquisition period is on the order of tens of times the nominal period $T_{nominal}$ and for the maximum initial acquisition period, on the order of thousands of times $T_{nominal}$.

The duration of the initial acquisition period is intentionally selected at random in order to reduce the probability of several stations entering the Active state at the same time. This may happen, for example, when power is restored to many stations at the same time after a long power down period. As an example, the initial acquisition period parameter may be set to a few hundred times the value of the minimum acquisition period. Once the initial acquisition parameter is chosen, the station enters the Initial Acquisition state 42.

Once the wait time is selected, the station waits for the receipt of one or more synchronization signals (step 54). If one or more synchronization signals are detected, the given station sets the received time $t_{received}$ to the earliest of the one or more synchronization signals received (step 56). The station then sets its internal clock phase t equal to $t_{received}+T$, where $t_{received}$ represents the time of detection of the earliest of the one or more synchronization signals (step 58). The station then proceeds to enter the Phase Acquisition state 44 (step 60).

If no synchronization signal is detected during the initial acquisition period, i.e. the timeout period expires (step 54), the given station sets its internal clock phase t to an arbitrary value (step 62), sets the new expected time for the next tick of the internal clock to t+T (step 64) and proceeds directly to the Active state 48 (step 66).

Figure 8:
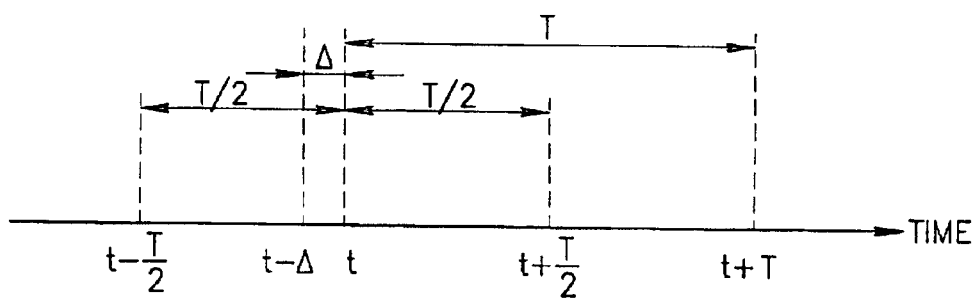
FIG. 8 is a diagram illustrating the relative time windows used in the distributed synchronization mechanism of the present invention.

While in the Phase Acquisition state, the station is operative to update the phase of its internal clock without altering the rate of the internal clock rate. In addition, the time centered around the expected next tick t of the internal clock is divided into several regions or time windows. A diagram illustrating an example of the relative time windows used in the distributed synchronization mechanism of the present invention is shown in FIG. 8. In this example, the time windows created span the duration of a period T. The time before t is divided into two time windows: the first window having a length Δ from t−Δ to t and the second window from t−T/2 to t−Δ. A time window later then t is defined from t to t+T/2.

Figure 9:
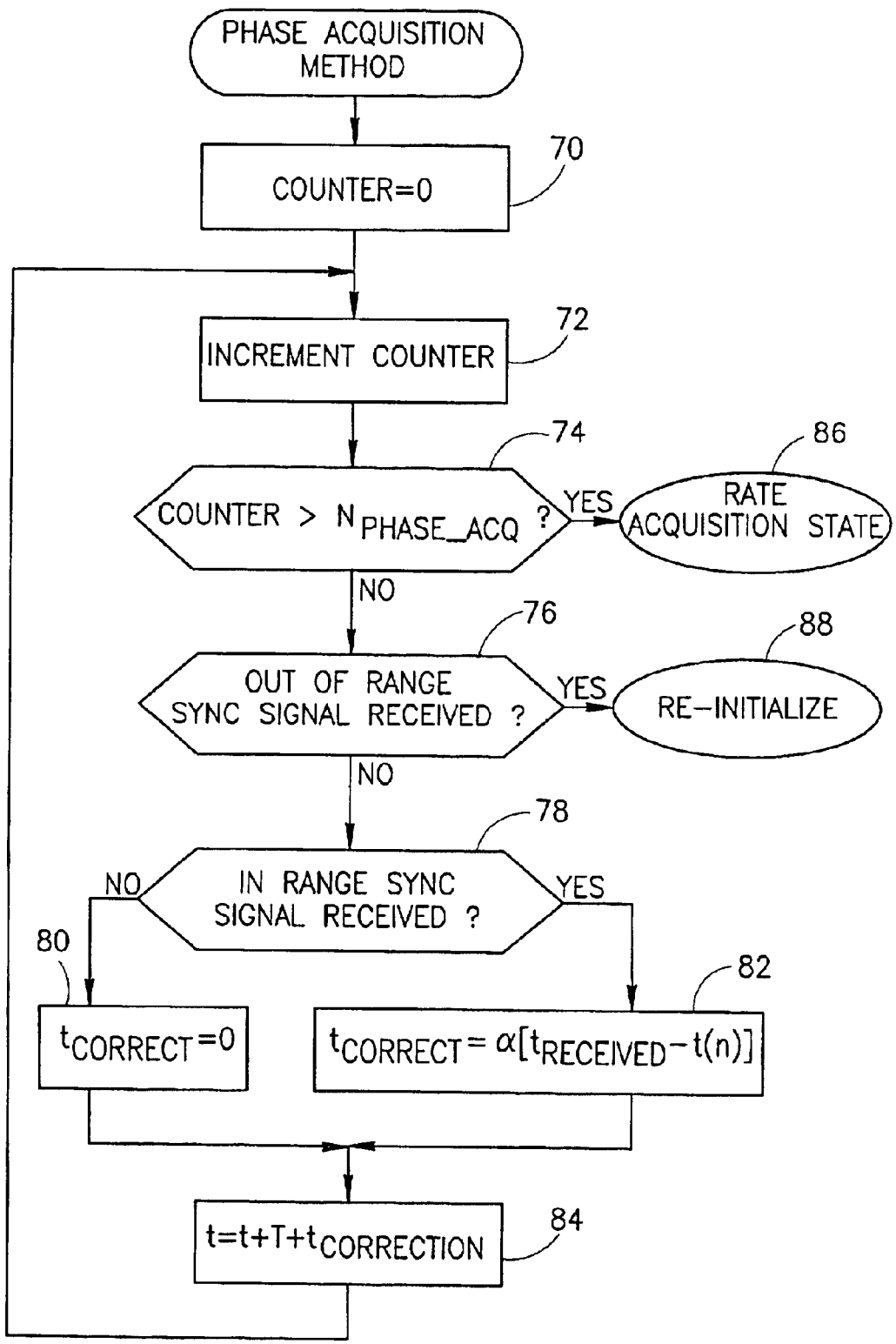
FIG. 9 is a flow diagram illustrating the method of the Phase Acquisition state in more detail.

The method of the Phase Acquisition state will now be described in more detail. A flow diagram illustrating the method of the Phase Acquisition state in more detail is shown in FIG. 9. The station is adapted to perform the phase updating at internal clock intervals. The station remains in this state for a $N_{phase\_acq}$ number of intervals. The number of intervals is counted by the acquisition counter which is maintained within each station. The acquisition counter is incremented at each interval of the internal clock. When the acquisition counter reaches a count of $N_{phase\_acq}$ the station resets the acquisition counter and enters the Rate Acquisition state 46.

Note that it is not intended that the invention be limited to a station staying in the Phase or Rate Acquisition state for a given time period. In the alternative, rather than wait a fixed time period, each station is adapted to wait until the phase changes that occur (while in the Phase Acquisition state) or the rate changes that occur (while in the Rate Acquisition state) are less than a threshold.

Initially, the acquisition counter is reset to zero (step 70). The loop begins by incrementing the acquisition counter (step 72) and checking whether the count has exceeded $N_{phase\_acq}$ (step 74). If so, the station leaves the Phase Acquisition state and enters the Rate Acquisition state 46 (step 86).

The internal clock phase is updated based on the detected synchronization signals as follows. As described supra, the variable t is the expected time of the next tick of the internal clock. The given station considers only synchronization signals received before time t, i.e. synchronization signals received during the time range between t−T/2 and t. As described supra, the range is further divided into two windows: one extending from t−T/2 to t−Δ and the other extending from t−Δ to t. The later in time window is used to identify in-range synchronization signals which are used in the phase acquisition process. Synchronization signals received during the earlier window are considered out-of-range and trigger the re-initialization process described infra. Synchronization signals received in the time window after time t are ignored.

Note that the value of parameter Δ is preferably set to several times the maximum expected propagation delay between two directly connected stations. For power line carrier based networks, this value is typically on the order of several microseconds.

With reference to FIG. 9, if a count of $N_{phase\_acq}$ has not been reached (step 74), it is checked whether an out of range synchronization signal has been received (step 76). If one or more synchronization signals are received within the time window between t−T/2 and t−Δ, i.e. out of range, the given station enters the Re-initialization state 40 (step 88). If no out of range synchronization signal is received during the time window, it is checked whether one or more synchronization signals are received within the time window extending from t−Δ to t, i.e. in range (step 78).

If an in-range synchronization signal is received, the given station uses the earliest of those pulses for phase tracking, calculates and applies a correction value (step 82) to the internal clock phase (step 84) as described below. Using the earliest synchronization signal functions to eliminate the problem of diverging clock periods associated with the first embodiment of the distributed synchronization scheme described above.

The correction value is calculated as follows. The given station sets the value of $t_{received}$ to the time of the earliest of the synchronization signals received within that window. The phase correction value $t_{correction}$ is calculated using Equation 2

$$t_{correction} = \alpha \cdot [t_{received} - t(n)] \quad (2)$$

where $t_{correction}$ is the phase correction value;

t(n) is the time of the reference clock corresponding to tick n of the internal clock;

α is a parameter set within the range 0<α≦1;

The function of the parameter α is to provide a tradeoff between either fast or slow tracking. High values for α provide for quicker tracking since more of the time difference between the two clocks is incorporated into the phase correction. High values of α, however, causes noisier tracking. On the other hand, low values of a provide slower but less noisy tracking.

The given station then updates its internal clock phase t as follows $$t(n+1) = t(n) + T + t_{correction} \quad (4)$$

where t(n+1) is the time of the reference clock corresponding to tick n+1 of the internal clock;

T is the current setting of the period of the internal clock (note that T was set to $T_{nominal}$ during the Initial Acquisition state;

Note that if no in range synchronization signal is received before time t within the window between t−Δ and t (step 78), then the given station sets the value of $t_{correction}$ to zero and updates its internal clock phase t as described above in Equation 4 (step 84).

Note also that since the synchronization signal that arrives the earliest in time is used, the value of $t_{received}$ is always less than the time of the expected next tick t(n) of the internal clock. Therefore, it follows that $t_{correction}$ will always be negative or zero and the new expected tick will correspond to a faster rate.

After phase acquisition is complete, the phase of the internal clock is aligned with the phase of the station having the fastest internal clock. The given state then enters the Rate Acquisition state 46. In this state, the given station updates both the phase and rate of its internal clock. Updating is performed at intervals of the internal clock. The station remains in this state for $N_{rate\_acq}$ number of intervals. The number of intervals is counted using the acquisition counter which is incremented at each interval. When the count value of the acquisition counter reaches $N_{rate\_acq}$, the given station enters the Active state 48.

Figure 10:
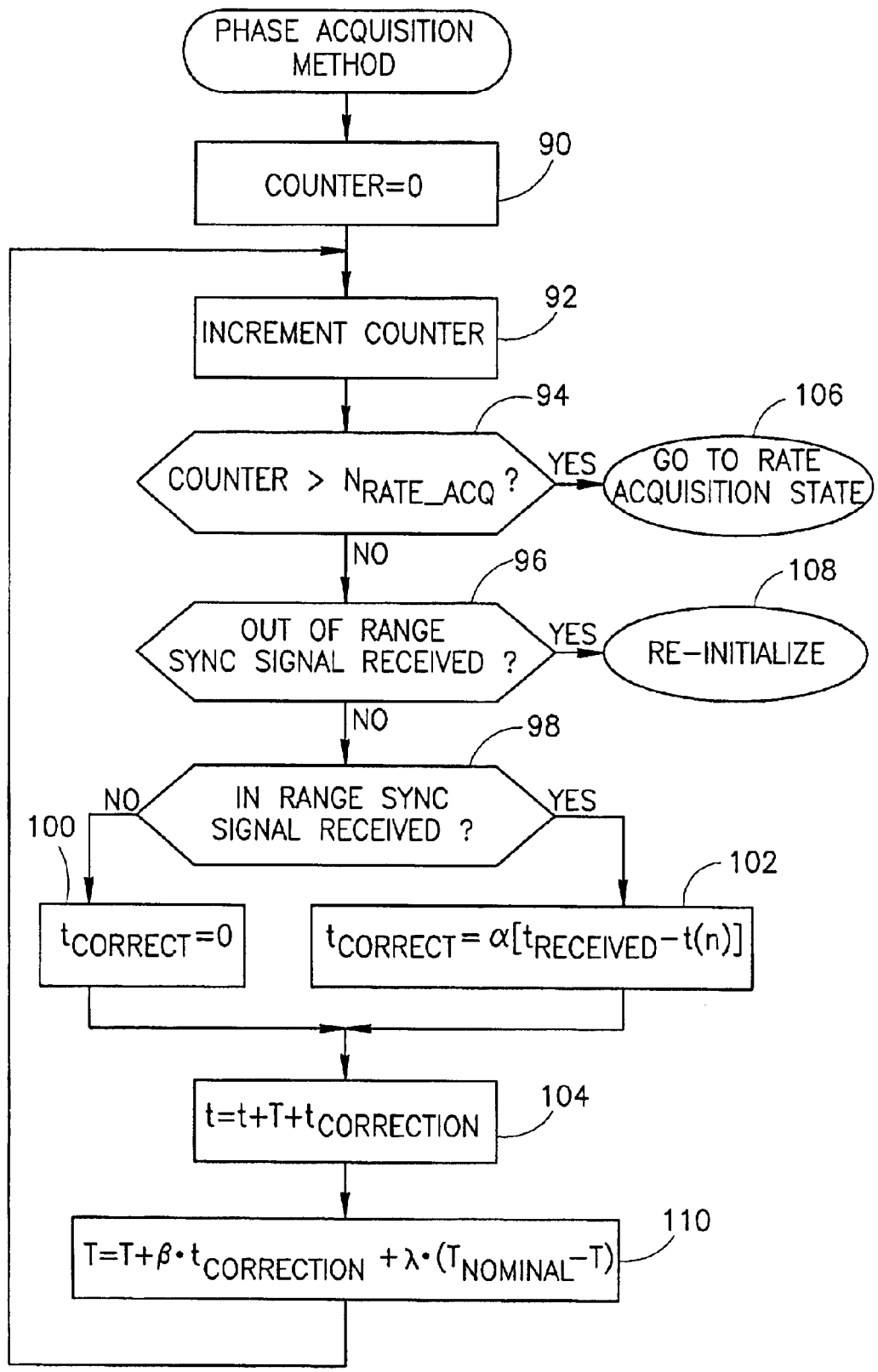
FIG. 10 is a flow diagram illustrating the method of the Rate Acquisition state in more detail.

A flow diagram illustrating the method of the Rate Acquisition state in more detail is shown in FIG. 10. Initially, the acquisition counter is reset to zero (step 90). The loop begins by incrementing the acquisition counter (step 92) and checking whether the count has exceeded $N_{rate\_acq}$ (step 94). If so, the station leaves the Rate Acquisition state and enters the Active state 46 (step 96).

If a count of $N_{rate\_acq}$ has not been reached (step 94), it is checked whether an out of range synchronization signal has been received (step 96). If one or more out of range synchronization signals are received, the given station enters the Re-initialization state 40 (step 108). If no out of range synchronization signal is received, it is checked whether one or more in range synchronization signals are received (step 98).

If no in range signals are received, the correction value $t_{correct}$ is set to zero (step 100) and the internal clock phase is updated (step 104). If an in range synchronization signal is received, the given station uses the earliest of those pulses for phase and rate tracking, calculates a correction value (step 102), applies the correction value to the internal clock phase (step 104) and updates the internal clock period T (step 110).

During this state, the phase of the internal clock is adjusted in the same manner as during the Phase Acquisition state described supra. The rate of the internal clock rate is adjusted as follows $$T = T + \beta \cdot t_{correction} + \lambda \cdot (T_{nominal} - T) \quad (5)$$

where β and λ are factors within the range 0 to less then or equal to 1.

The parameter β determines the speed of the rate alignment process. Typically, the rates of the internal clocks are relatively stable. Therefore, in most cases there is no need for fast rate alignment and β can be set to a relatively small value. Using a small value for β increases the stability of the rate tracking process and reduces the station's susceptibility to noisy reception. Note that The value of λ is typically set to much less then the value of β.

The term $\beta^* t_{correction}$ in Equation 5 has the same function as in Equation 3 with one major difference in that here the late synchronization signals are ignored which makes $\beta^* t_{correction}$ negative or zero by default. Therefore, the term $\beta^* t_{correction}$ causes the value of the period T to be reduced. The reason for the inclusion of the term $\lambda^*(T_{nominal} - T)$ is described below in the context of an example.

As an illustration, let us denote the station with the fastest reference clock as station A. It may happen that due to transitory conditions station A detects one or more synchronization signals before its own internal clock tick. In this case, the use of Equation 5 without the term $\lambda^*(T_{nominal} - T)$ would reduce the value of T in station A. This, however, is an undesired result because station A is the station with the fastest clock and a reduction of T may never be reversed.

Therefore, the term $\lambda^*(T_{nominal} - T)$ is included in Equation 5. The effect of this term is to gradually increase the value of T back to $T_{nominal}$. Preferably, λ is chosen to be considerably smaller than β, so as to achieve the desired effect that for all stations other than station A, the term $\lambda^*(T_{nominal} - T)$ will have a minor effect. For station A, however, including this term causes the period T to increase to $T_{nominal}$. As an example, β may be set to a value of 0.1 and λ to a value of 0.01.

Once the rate adjustment is complete, the given station enters the Active state 48 which is the desired goal of the distributed synchronization mechanism. In this state the given station is fully synchronized to the fastest station in its maximum connected group. In this and only this state, the station transmits synchronization signals. In addition, while in this state, the given station periodically updates both its internal clock phase and internal clock rate in the same manner rate as in the Rate Acquisition state described supra.

Occasionally, the synchronization mechanism must be re-initialized. Re-initialization takes place when one or more synchronization signals are received within the out of range time window between $t-T/2$ and $t-\Delta$. Note that the re-initialization process may be triggered during either the Phase Acquisition state, Rate Acquisition state or the Active state.

Figure 11:
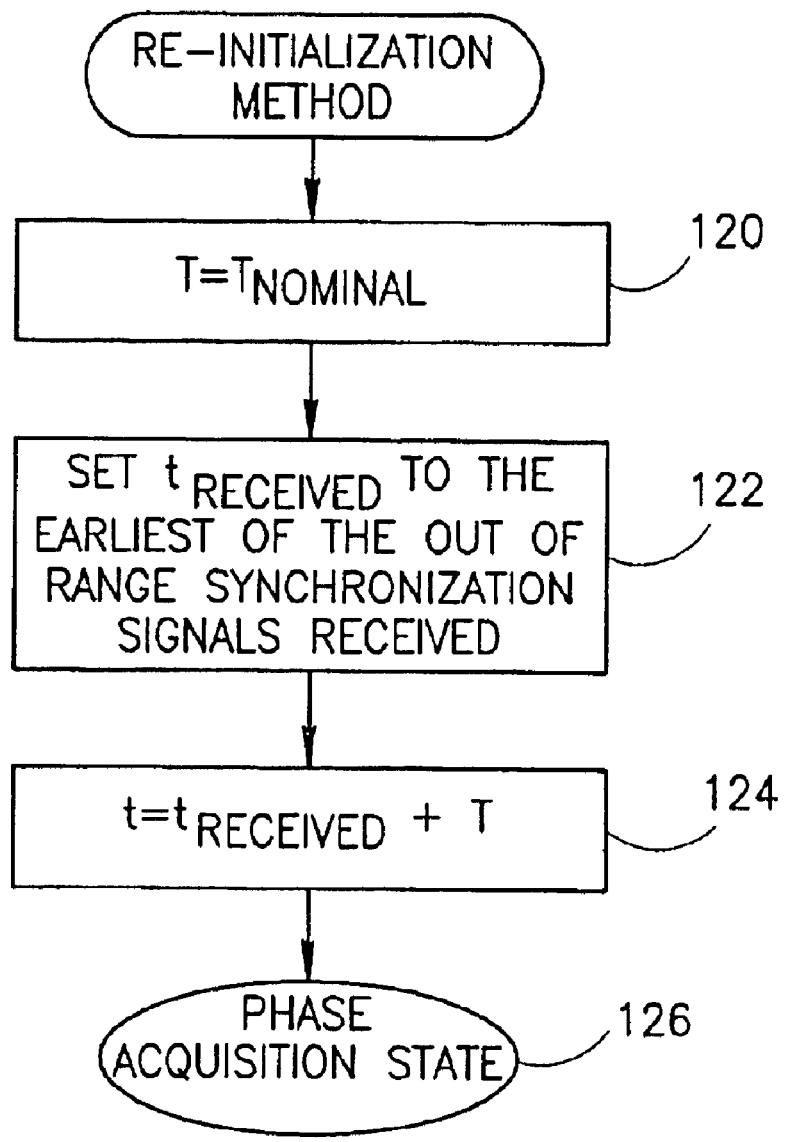
FIG. 11 is a flow diagram illustrating the method of the Re-initialization state of the distributed synchronization mechanism of the present invention.

A flow diagram illustrating the re-initialization method of the distributed synchronization mechanism of the present invention is shown in FIG. 11. During re-initialization, the given station resets the internal clock period T to $T_{nominal}$ (step 120) and sets $t_{received}$ to the time of the earliest of the out of range synchronization signals received (step 122). The given station then sets its internal clock phase t to $t_{received}+T$ (step 124) and enters the Phase Acquisition state (step 126).

Note that typically, re-initialization is rarely triggered. The following example illustrates the process. Assume that two maximum connected groups, denoted by group 1 and group 2, are operating independently over a given shared communications media and that a new station A is inserted onto the media. Let us further assume that station A is directly connected to one or more stations in group 1 and to one or more stations in group 2. The result is a new maximum connected group comprising the stations in group 1, the stations in group 2 and the new station A. Upon the installation of station A, the new group now contains two subgroups which are not synchronized to each other. Thus, the synchronization signals of one subgroup will be out-of-range to the other group. Eventually, one subgroup (i.e. the group with the fastest ad-hoc master) will take over by forcing stations from the other subgroup to adjust or switchover their internal clocks to that of the master. The switch over is carried out via the re-initialization process. Note that in a steady state situation, when new stations are not introduced, the re-initialization process should not be needed.

One consideration for implementing a system based on the principles of the present invention is that in the example presented above, the reception time window is set between $t-T/2$ and t. The reason for this time window is that in situations where station A receives the synchronization signals of station B before $t-T/2$, station B will subsequently receive the synchronization signals from station A within the range $t-T/2$ to t, and consequently will align its clock to that of station A. It may happen, however, that the above situation is not decisive in that a signal is received exactly at time $t-T/2$ (the term exactly meaning up to the tolerance of the variables). In this case, it is not clear whether station A should align its clock to station B, or vice versa.

In order to overcome those potential rare events, the mechanism of the present invention is changed as follows. A given station in Active state opens a window in the range from $t-T/2-\Delta_1$ to $t-T/2+\Delta_1$ where $\Delta_1$ is not related to the Δ used above. If a synchronization signal is detected within this window, the given station broadcasts a reset signal. The reset signal is repeated by all the stations that detect it and thus it is propagated to all the stations in the maximum connected group that includes the given station. Every station that detects the reset signal re-enters the Initial Acquisition state. This causes the entire group of stations to re-synchronize their internal clocks. Once the stations are re-synchronized, it is unlikely that an ambiguous situation will arise again.

A second consideration is that the distributed synchronization mechanism described above depends on the detection of the synchronization signals. The detection of in-range synchronizations signals can be insured by allowing no other transmissions to take place during the time zone in which these signals are expected (e.g., from $t-\Delta$ to $t+\Delta$).

Note, however, that it is not practical to insure the detection of out-of-band synchronization signals using the same technique. It is possible, however, to allocate specific time frames in the link layer protocol for this purpose. For example, it can be specified that every $10^{th}$ time frame is not used for regular transmissions and is reserved for enabling out-of-band synchronization signals to be detected. Note that in this case, the duration of a frame is on the order of the period T. In most cases, such a scheme should be adequate since the reception of out-of-range synchronization signals is a rare event.

Station Incorporating the Distributed Synchronization Mechanism

Figure 12:
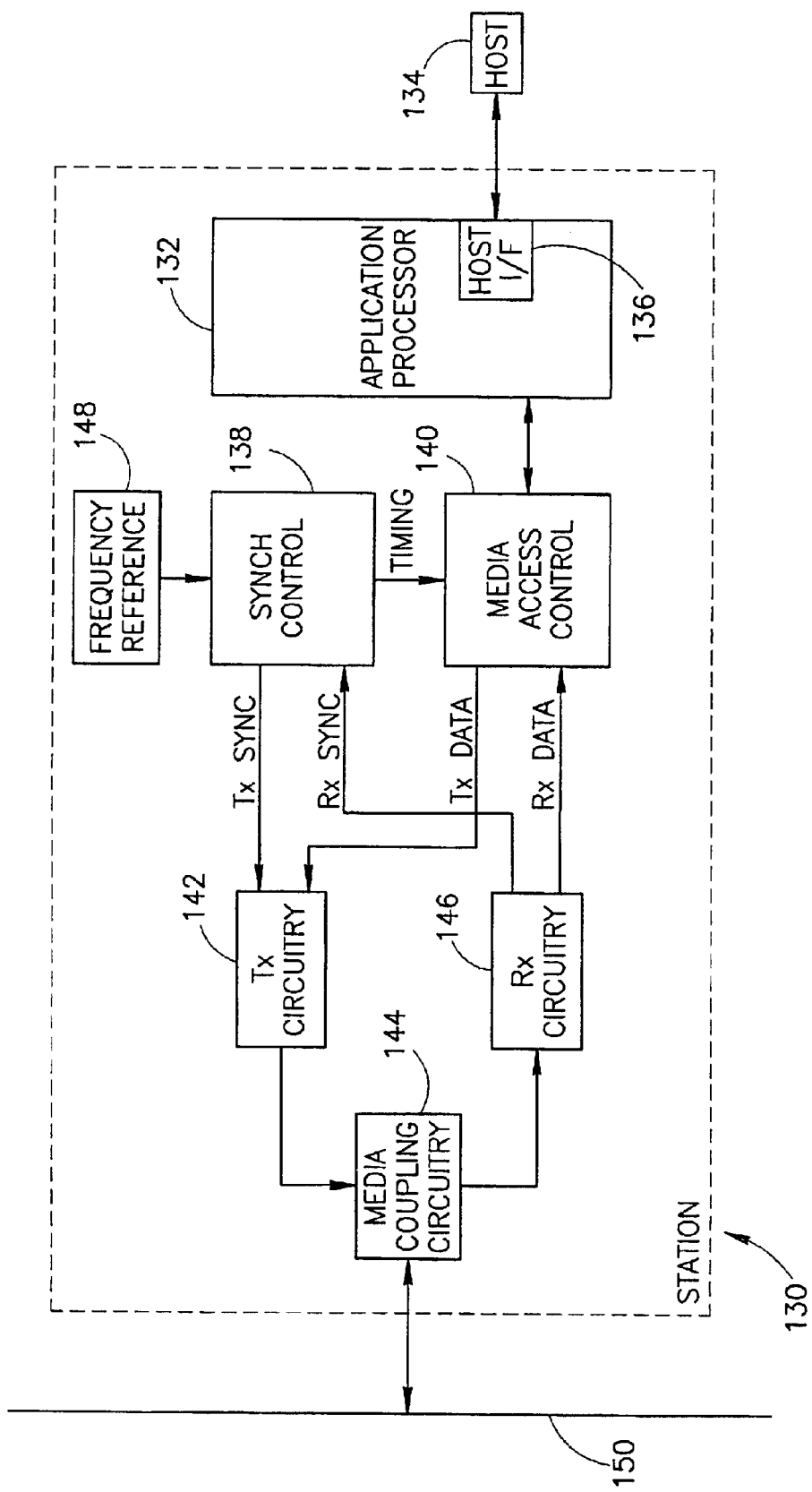
FIG. 12 is a block diagram illustrating an example embodiment of a station incorporating a synchronization circuit adapted to perform the distributed synchronization mechanism of the present invention.

An example embodiment of a node device incorporating a synchronization control circuit of the present invention will now be described. A block diagram illustrating an example embodiment of a station incorporating a synchronization control circuit constructed to perform the distributed synchronization mechanism of the present invention is shown in FIG. 12. The station, generally referenced 130, represents a station that may operate stand alone or may be incorporated within a network device such as a switch, router, hub, broadband modem, cable modem, PLC based modem, etc. for performing communication functions (i.e. implementing OSI stack protocol functions including MAC functionality). The station comprises an application processor 132 with associated static, dynamic, volatile and/or non-volatile memory (not shown) in communication therewith. The application processor is also in communication, via a host interface 136, with a host-computing device 92. The host may be adapted to communicate over one or more networks.

The station comprises media coupling circuitry 144 for interfacing the station to the shared media 150 and synchronization control circuit 138. The synchronization circuit is constructed to perform the distributed synchronization mechanism of the present invention including synchronizing to the station with the fastest internal clock using the methods and techniques described hereinabove. A frequency reference 148 comprising any suitable clock circuit, such as temperature compensated crystal oscillators, ceramic oscillators, etc., provides the reference clock source for the synchronization control circuit. The synchronization control circuit is operative to generate one or more sync signals TxSync that are input to the Tx circuitry 142. Sync signals received from the media are output from the Rx circuit (RxSync signal) to the synchronization control circuit. The synchronization control circuit also functions to provide one or more timing control signals used within the MAC circuit.

Transmit circuitry 142 and receive circuitry 146 communicate over the media via the media coupling circuitry. The Rx circuitry is adapted to output the receive data signal RxData as well as the RxSync synchronization signal used by the synchronization control circuit in performing the distributed synchronization processes. The media access controller (MAC) 140 functions, on one side, to provide transmit data (TxData signal) to the transmit circuit and to receive data (RxData signal) from the receive circuit. On the processor side, it interfaces to the application processor. The MAC is adapted to implement any suitable media access control technique as is well known in the art.

Note that the distributed synchronization mechanism and the MAC may be implemented in either hardware or software. Software implementation may be adapted to reside on a computer readable medium, such as a magnetic disk, floppy disk, Flash memory card, EEROM based memory, bubble memory storage, RAM storage, ROM storage, etc. The software may also reside, in whole or in part, in the static or dynamic main memories or in firmware within the processor of a computer system. The processor may comprise any suitable processing means including microcontroller, microcomputer, microprocessor, digital signal processor, FPGA core, ASIC core, etc. In particular, the media access control software comprises a sequence of instructions which, when executed by the processor, cause the computer system to perform the distributed synchronization mechanism described hereinabove.

In alternative embodiments, the present invention may be applicable to implementations of the methods and apparatus described above in integrated circuits, especially Application Specific Integrated Circuits (ASICs), Field Programmable Gate Arrays (FPGAs) or chip sets, wireless modem implementations, powerline modem implementations, switching system products and transmission system products. Note that a combination of software and hardware can also be implemented, the former performing the complex operations and the latter performing the time critical operations.

For the purpose of this document, the terms switching systems products shall be taken to mean private branch exchanges (PBXs), central office switching systems that interconnect subscribers, toll/tandem switching centers and broadband core switches located at the center of a service provider's network that may be fed by broadband edge switches or access multiplexers and associated signaling and support system services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of distributed synchronization for use in a network comprising a plurality of stations communicating over a shared media, said method comprising the steps of:

detecting, on a given station, one or more synchronization signals transmitted by stations directly connected to said given station; and aligning the phase and rate of an internal clock in said given station in accordance with an earliest received synchronization signal having a time phase earlier to the time phase of said internal clock.

2. The method according to claim 1, wherein said step of aligning comprises performing a second order tracking loop wherein both the phase and rate of said internal clock are adjusted to the reception time of said earliest received synchronization signal.

3. The method according to claim 2, wherein said second order tracking loop updates the rate of said internal clock in accordance with $T = T + \beta \cdot t_{correction} + \lambda \cdot (T_{nominal} - T)$.

4. The method according to claim 1, wherein no one station among said plurality of stations is configured to function as a master station.

5. The method according to claim 1, wherein said earliest received synchronization signal is received within a time window occurring earlier to the expected time of the next tick of said internal clock.

6. The method according to claim 5, wherein the length of said time window comprises a predefined fixed time duration.

7. The method according to claim 5, wherein the length of said time window is programmable and is adapted to be set dynamically.

8. The method according to claim 1, further comprising the step of ignoring synchronization signals received outside of a time window occurring before the expected time of the next tick of said internal clock.

9. The method according to claim 1, wherein said step of alignment comprises aligning the phase of said internal clock in accordance with $t(n+1) = t(n) + T + t_{correction}$ where $t(n+1)$ is the time of a reference clock corresponding to tick $n+1$ of said internal clock, $T$ is the current setting of the period of the internal clock and $t_{correction}$ is the phase correction value given by $t_{correction} = \alpha \cdot [t_{received} - t(n)]$ where $\alpha$ is a parameter set within the range $0 < \alpha \leq 1$ and $t_{received}$ is the time of the earliest of the synchronization signals received.

10. The method according to claim 1, wherein said step of alignment comprises aligning the rate of said internal clock in accordance with $T = T + \beta \cdot t_{correction} + \lambda \cdot (T_{nominal} - T)$ where $\beta$ and $\lambda$ are factors within the range 0 to less then or equal to 1, $T_{nominal}$ is the nominal period and $t_{correction}$ is the phase correction value given by $t_{correction} = \alpha \cdot [t_{received} - t(n)]$ where $\alpha$ is a parameter set within the range $0 < \alpha \leq 1$ and $t_{received}$ is the time of the earliest of the synchronization signals received.

11. The method according to claim 1, further comprising the step of re-aligning both the phase and rate of said internal clock, if after initial alignment is achieved, one or more synchronization signals are received earlier in time than a first time window before the expected time of the next tick of said internal clock.

12. The method according to claim 1, wherein eventually all stations within a maximum connected group of stations adjust their internal clocks to the same rate.

13. The method according to claim 1, wherein eventually all stations within a maximum connected group of stations adjust their internal clocks to the rate of a single station in said maximum connected group that effectively functions as an ad hoc master thereof.

14. The method according to claim 1, wherein all stations within a maximum connected group of stations synchronize their respective internal clocks to the station with the fastest internal clock within said maximum connected group.

15. A method of synchronizing a plurality of stations directly connected to each other in a shared communications media based network, said method comprising the steps of:

attempting, on a given station, to detect other stations already active in said network; and if one or more synchronization signals are detected, updating the phase of an internal clock in said given station in response to an earliest received synchronization signal received before the expected next tick of said internal clock;

updating the rate of said internal clock as a function of the time difference between time phase of said earliest received synchronization signal and the time phase of said given station; and said given station transmitting synchronization signals upon achieving phase and rate alignment with said earliest received synchronization signal.

16. The method according to claim 15, wherein if no synchronization signals are detected, setting the phase of said internal clock to a random value, rate to a nominal rate and entering an active state wherein said given station begins transmitting synchronization signals.

17. The method according to claim 15, wherein eventually, phase and rate alignment is achieved with a station comprising the fastest internal clock from among said plurality of directly connected stations.

18. The method according to claim 15, wherein said earliest received synchronization signal is received within a time window proportional to the maximum expected propagation delay between two directly connected stations.

19. The method according to claim 15, wherein said step of alignment comprises aligning the phase of said internal clock in accordance with $t(n+1)=t(n)+T+t_{correction}$ where $t(n+1)$ is the time of a reference clock corresponding to tick $n+1$ of said internal clock, T is the current setting of the period of the internal clock and $t_{correction}$ is the phase correction value given by $t_{correction}=\alpha \cdot [t_{received}-t(n)]$ where $\alpha$ is a parameter set within the range $0<\alpha \leq 1$ and $t_{received}$ is the time of the earliest of the synchronization signals received.

20. The method according to claim 15, wherein said step of alignment comprises aligning the rate of said internal clock in accordance with $T=T+\beta \cdot t_{correction}+\lambda \cdot (T_{nominal}-T)$ where $\beta$ and $\lambda$ are factors within the range 0 to less then or equal to 1, $T_{nominal}$ is the nominal period and $t_{correction}$ is the phase correction value given by $t_{correction}=\alpha \cdot [t_{received}-t(n)]$ where $\alpha$ is a parameter set within the range $0<\alpha \leq 1$ and $t_{received}$ is the time of the earliest of the synchronization signals received.

21. The method according to claim 15, wherein eventually all stations within a maximum connected group of stations adjust their internal clocks to the rate of a single station in said maximum connected group that effectively functions as an ad hoc master thereof.

22. The method according to claim 15, wherein all stations within a maximum connected group of stations synchronize their respective internal clocks to the station with the fastest internal clock within said maximum connected group.

23. The method according to claim 15, further comprising the step of re-alignment of both the phase and rate of said internal clock, if after initial alignment is achieved, one or more synchronization signals are received earlier in time than a first time window before the expected time of the next tick of said internal clock.

24. The method according to claim 15, wherein said step of updating the phase of said internal clock is performed for a predetermined time interval.

25. The method according to claim 15, wherein said step of updating the rate of said internal clock is performed for a predetermined time interval.

26. The method according to claim 15, further comprising the step of ignoring synchronization signals received outside of a time window occurring before the expected time of the next tick of said internal clock.

27. An apparatus for synchronizing a plurality of stations directly connected to each other over a shared communications media based network, comprising:

a detection mechanism adapted to detect synchronization signals transmitted by other stations already active in said network;

a phase acquisition mechanism adapted to update the phase of an internal clock in a given station in response to an earliest detected synchronization signal received before the expected next tick of said internal clock;

a rate acquisition mechanism adapted to update the rate of said internal clock as a function of the time difference between time phase of said earliest detected synchronization signal and the time phase of said given station; and a transmission mechanism adapted to transmit synchronization signals upon achieving phase and rate alignment with said earliest detected synchronization signal.

28. The apparatus according to claim 27, wherein eventually, phase and rate alignment is achieved with a station comprising the fastest internal clock from among said plurality of directly connected stations.

29. The apparatus according to claim 27, wherein said earliest received synchronization signal is received within a time window proportional to the maximum expected propagation delay between two directly connected stations.

30. The apparatus according to claim 27, wherein said phase acquisition mechanism is adapted to align the phase of said internal clock in accordance with $t(n+1)=t(n)+T+t_{correction}$ where $t(n+1)$ is the time of a reference clock corresponding to tick $n+1$ of said internal clock, T is the current setting of the period of the internal clock and $t_{correction}$ is the phase correction value given by $t_{correction}=\alpha \cdot [t_{received}-t(n)]$ where $\alpha$ is a parameter set within the range $0<\alpha \leq 1$ and $t_{received}$ is the time of the earliest of the synchronization signals received.

31. The apparatus according to claim 27, wherein said rate acquisition mechanism is adapted to align the rate of said internal clock in accordance with $T=T+\beta \cdot t_{correction}+\lambda \cdot (T_{nominal}-T)$ where $\beta$ and $\lambda$ are factors within the range 0 to less then or equal to 1, $T_{nominal}$ is the nominal period and $t_{correction}$ is the phase correction value given by $t_{correction}=\alpha \cdot [t_{received}-t(n)]$ where $\alpha$ is a parameter set within the range $0<\alpha \leq 1$ and $t_{recieved}$ is the time of the earliest of the synchronization signals received.

32. The apparatus according to claim 27, wherein eventually all stations within a maximum connected group of stations adjust their internal clocks to the frequency of a single station in said maximum connected group that effectively functions as an ad hoc master thereof.

33. The apparatus according to claim 27, wherein all stations within a maximum connected group of stations synchronize their respective internal clocks to the station with the fastest internal clock within said maximum connected group.

34. The apparatus according to claim 27, further comprising a re-alignment mechanism adapted to re-align both the phase and rate of said internal clock, if after initial alignment is achieved, one or more synchronization signals are received earlier in time than a first time window before the expected time of the next tick of said internal clock.

35. The apparatus according to claim 27, wherein said phase acquisition mechanism is operative to ignore synchronization signals received outside of a time window occurring before the expected time of the next tick of said internal clock.

36. A communications station for transmitting and receiving signals to and from other directly connected stations over a shared communications media based network, comprising:

a coupling circuit for generating a receive signal received over said network and for outputting a transmit signal onto said network;

a transmitter adapted to modulate data to be transmitted in accordance with a modulation scheme so as to generate said transmit signal therefrom;

a receiver adapted to demodulate said receive signal in accordance with said modulation scheme so as to generate synchronization signals and a receive data signal therefrom;

a media access control (MAC) circuit adapted to interface an application processor to said shared communications media;

a synchronization control circuit comprising means adapted to:
detect one or more synchronization signals transmitted by said other directly connected stations;
align the phase and rate of an internal clock in accordance with an earliest received synchronization signal having a time phase earlier to the time phase of said internal clock; and said processor adapted to control the operation of said transmitter, receiver and MAC and to provide an interface between said MAC and an external host.

37. The method according to claim 36, wherein said synchronization control circuit is adapted to execute a second order tracking loop wherein both the phase and rate of said internal clock are adjusted to the reception time of said earliest received synchronization signal.

38. The communications station according to claim 36, wherein said earliest received synchronization signal is received within a time window occurring earlier to the expected time of the next tick of said internal clock.

39. The communications station according to claim 36, wherein said synchronization control circuit further comprises means adapted to ignore synchronization signals received outside of a time window occurring before the expected time of the next tick of said internal clock.

40. The communications station according to claim 36, wherein said synchronization control circuit is adapted to align the phase of said internal clock in accordance with $t(n+1)=t(n)+T+t_{correction}$ where $t(n+1)$ is the time of a reference clock corresponding to tick n+1 of said internal clock, T is the current setting of the period of the internal clock and $t_{correction}$ is the phase correction value given by $t_{correction}=\alpha \cdot [t_{received}-t(n)]$ where $\alpha$ is a parameter set within the range $0<\alpha \leq 1$ and $t_{received}$ is the time of the earliest of the synchronization signals received.

41. The communications station according to claim 36, wherein said synchronization control circuit is adapted to align the rate of said internal clock in accordance with $T=T+\beta \cdot t_{correction}+\lambda \cdot (T_{nominal}-T)$ where $\beta$ and $\lambda$ are factors within the range 0 to less then or equal to 1, $T_{nominal}$ is the nominal period and $t_{correction}$ is the phase correction value given by $t_{correction}=\alpha \cdot [t_{received}-t(n)]$ where $\alpha$ is a parameter set within the range $0<\alpha \leq 1$ and $t_{received}$ is the time of the earliest of the synchronization signals received.

42. The communications station according to claim 36, wherein said synchronization control circuit further comprises means for re-aligning both the phase and rate of said internal clock, if after initial alignment is achieved, one or more synchronization signals are received earlier in time than a first time window before the expected time of the next tick of said internal clock.

43. The communications station according to claim 36, wherein eventually all stations within a maximum connected group of stations adjust their internal clocks to the same rate.

44. The communications station according to claim 36, wherein eventually all stations within a maximum connected group of stations adjust their internal clocks to the frequency of a single station in said maximum connected group that effectively functions as an ad hoc master thereof.

45. The communications station according to claim 36, wherein all stations within a maximum connected group of stations synchronize their respective internal clocks to the station with the fastest internal clock within said maximum connected group.

* * * * *